US 10,316,753 B2

(12) United States Patent
Packard et al.

(10) Patent No.: US 10,316,753 B2
(45) Date of Patent: Jun. 11, 2019

(54) PRE-COOLER INLET DUCTS THAT UTILIZE ACTIVE FLOW-CONTROL AND SYSTEMS AND METHODS INCLUDING THE SAME

(71) Applicant: The Boeing Company, Huntington Beach, CA (US)

(72) Inventors: Nathan O. Packard, Lake Stevens, WA (US); Robert H. Willie, Bothell, WA (US); Paul R. Tretow, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 1090 days.

(21) Appl. No.: 14/491,778

(22) Filed: Sep. 19, 2014

(65) Prior Publication Data
US 2016/0084165 A1   Mar. 24, 2016

(51) Int. Cl.
*F02C 7/18*   (2006.01)
*B64C 21/02*   (2006.01)
(Continued)

(52) U.S. Cl.
CPC ............ *F02C 7/185* (2013.01); *B64C 21/025* (2013.01); *B64C 21/04* (2013.01); *B64D 33/02* (2013.01);
(Continued)

(58) Field of Classification Search
CPC ............. F02C 6/08; B64D 2013/0622; B64D 2013/0618; B64D 2033/0266;
(Continued)

(56) References Cited

U.S. PATENT DOCUMENTS 6,360,763 B1   3/2002   Narayanan et al.
7,055,541 B2 *  6/2006   Seifert ...................... F15C 1/10
                                                                137/14
(Continued)

FOREIGN PATENT DOCUMENTS

EP   1 643 083   4/2006
GB   1291943    10/1972

OTHER PUBLICATIONS

European Patent Office, Extended European Search Report for related foreign patent EP 15183727, dated Feb. 12, 2016.
(Continued)

*Primary Examiner* — Gerald L Sung
*Assistant Examiner* — Alain Chau
(74) *Attorney, Agent, or Firm* — DASCENZO Intellectual Property Law, P.C.

(57) ABSTRACT

Pre-cooler inlet ducts that utilize active flow-control and systems and methods including the same are disclosed herein. The systems include a pre-cooler inlet duct for a jet engine that is configured to receive a pre-cooler air stream and to direct the pre-cooler air stream into a heat exchanger. The pre-cooler inlet duct includes a flow-directing surface, which defines at least a portion of the pre-cooler inlet duct, and an active flow-control device. The active flow-control device is located to modify a boundary layer fluid flow within a boundary layer adjacent the flow-directing surface to resist separation of the boundary layer from the flow-directing surface when the pre-cooler air stream flows through the pre-cooler inlet duct. The methods include methods of resisting boundary layer separation in the pre-cooler inlet duct by flowing the pre-cooler air stream across the flow-directing surface and modifying the boundary layer with the active flow-control device.

17 Claims, 7 Drawing Sheets

(51) Int. Cl.
*B64C 21/04* (2006.01)
*F02C 6/08* (2006.01)
*B64D 33/02* (2006.01)
*F15D 1/00* (2006.01)
*F02C 7/141* (2006.01)
*F02C 9/16* (2006.01)
*B64D 33/10* (2006.01)
*F01D 25/12* (2006.01)
*F15D 1/06* (2006.01)
*B64D 13/06* (2006.01)

(52) U.S. Cl.
CPC ........... *B64D 33/10* (2013.01); *F01D 25/125* (2013.01); *F02C 6/08* (2013.01); *F02C 7/141* (2013.01); *F02C 9/16* (2013.01); *B64D 2013/0618* (2013.01); *B64D 2033/0226* (2013.01); *B64D 2033/0286* (2013.01); *F05D 2210/30* (2013.01); *F05D 2270/17* (2013.01); *F15D 1/008* (2013.01); *F15D 1/06* (2013.01); *Y02T 50/56* (2013.01); *Y02T 50/671* (2013.01); *Y02T 50/675* (2013.01)

(58) Field of Classification Search
CPC . B64D 2033/0273; F15D 1/002; F15D 1/008; F15D 1/0065; B64C 21/025; B64C 21/04
See application file for complete search history.

(56) References Cited

U.S. PATENT DOCUMENTS

| 7,926,261 | B2 | 4/2011 | Porte | |
| 8,382,043 | B1* | 2/2013 | Raghu | B64C 21/04 244/1 N |
| 2005/0081530 | A1 | 4/2005 | Bagnall et al. | |
| 2008/0099631 | A1* | 5/2008 | Parikh | B64C 21/00 244/53 B |
| 2010/0140416 | A1* | 6/2010 | Ohanian, III | B64C 21/04 244/23 A |
| 2010/0243819 | A1* | 9/2010 | Stanislas | B64C 21/04 244/207 |
| 2012/0091266 | A1 | 4/2012 | Whalen et al. | |
| 2014/0053532 | A1 | 2/2014 | Zysman | |
| 2014/0102542 | A1* | 4/2014 | Raghu | B64C 13/40 137/2 |
| 2014/0182695 | A1 | 7/2014 | Alvi | |
| 2016/0273562 | A1* | 9/2016 | Seifert | B64C 21/08 |

OTHER PUBLICATIONS

Chiobaca, V., et al., "An Overview of Recent DLR Contributions on Active Flow-Separation Control Studies for High-Lift Configurations," Journal Aerospace Lab, Issue 6, Jun. 2013.

Kral, L., "Active Flow Control Technology," ASME Fluids Engineering Division Technical Brief, Washington University, St. Louis, Missouri.

State Intellectual Property Office of PRC, Office Action for related Chinese Application No. 201510596113, dated Jun. 29, 2018.

State Intellectual Property Office of PRC, Office Action for related Chinese Application No. 201510596113, dated Dec. 12, 2018.

English translation of State Intellectual Property Office of PRC, Office Action for related Chinese Application No. 201510596113, dated Dec. 12, 2018.

* cited by examiner

PRE-COOLER INLET DUCTS THAT UTILIZE ACTIVE FLOW-CONTROL AND SYSTEMS AND METHODS INCLUDING THE SAME

FIELD

The present disclosure relates to pre-cooler inlet ducts for nacelles of jet engines, and more particularly to pre-cooler inlet ducts that utilize active flow-control to interact with, modify, and/or energize a boundary layer fluid flow within a boundary layer adjacent to the pre-cooler inlet duct, and to systems and methods including the pre-cooler inlet duct.

BACKGROUND

Nacelles for jet engines may include a pre-cooler inlet duct that may direct a pre-cooler air stream onto a heat exchanger assembly to cool engine bleed air prior to it being utilized by the jet engine and/or by another component of an aircraft that includes the jet engine. The pre-cooler inlet duct may be present within the nacelle and may be located to receive a portion of a compressed air stream that may be pressurized by a compressor of the jet engine.

Because the pre-cooler inlet is located within the nacelle, a size of the pre-cooler inlet may be restricted by a size of the nacelle. Conversely, a given size pre-cooler inlet may dictate a needed size for a nacelle that may contain the pre-cooler inlet. In addition, a desired flow rate of the pre-cooler air stream also may dictate a needed size for the pre-cooler inlet duct.

Under certain conditions, it may be desirable to increase the flow rate of the pre-cooler air stream without increasing the size of the pre-cooler inlet duct. Additionally or alternatively, it also may be desirable to decrease the size of the pre-cooler inlet duct, such as to permit the pre-cooler inlet duct to be placed within a smaller nacelle and/or to decrease a portion of the interior of the nacelle that is utilized by the pre-cooler inlet duct, without decreasing the flow rate of the pre-cooler air stream.

Historically, traditional aerodynamic principles have been utilized to design the size and/or shape of the pre-cooler inlet duct. However, these traditional aerodynamic principles may limit the size and/or shape of the pre-cooler inlet, thereby restricting increases in the flow rate of the pre-cooler air stream and/or decreases in the size of the nacelle. It is with such considerations in mind that examples according to the present disclosure are described in further detail below.

SUMMARY

Pre-cooler inlet ducts that utilize active flow-control and systems and methods including the same are disclosed herein. The systems include a pre-cooler inlet duct for a jet engine that is configured to receive a pre-cooler air stream and to direct the pre-cooler air stream into a heat exchanger. The pre-cooler inlet duct includes a flow-directing surface, which defines at least a portion of the pre-cooler inlet duct, and an active flow-control device. The active flow-control device is located to modify a boundary layer fluid flow within a boundary layer adjacent the flow-directing surface, such as to resist separation of the boundary layer from the flow-directing surface when the pre-cooler air stream flows through the pre-cooler inlet duct. The active flow-control device may modify the boundary layer in any suitable manner, such as by interacting with and/or energizing the boundary layer, to resist separation of the boundary layer from the flow-directing surface.

In some embodiments, a radius of curvature of the flow-directing surface is less than a radius of curvature of a conventional flow-directing surface that does not include the active flow-control device. In some embodiments, a length of the flow-directing surface is less than a length of the conventional flow-directing surface.

In some embodiments, the active flow-control device is configured to inject a flow-control fluid stream into the boundary layer through an injection orifice. In some embodiments, the injection orifice forms a portion of a sweeping jet. In some embodiments, the active flow-control device is configured to continuously inject the flow-control fluid stream. In some embodiments, the active flow-control device is configured to intermittently inject the flow-control fluid stream. In some embodiments, the active flow-control device is configured to inject a plurality of flow-control fluid streams. In some embodiments, the active flow-control device is configured to vary which of the plurality of flow-control fluid streams is being injected at a given point in time.

In some embodiments, the active flow-control device includes a vortex generator configured to generate a vortex within the boundary layer. In some embodiments, the active flow-control device includes a suction assembly configured to remove a suction stream from the boundary layer.

In some embodiments, the pre-cooler inlet duct forms a portion of a nacelle for a jet engine. In some embodiments, the nacelle forms a portion of an aircraft.

The methods include methods of resisting boundary layer separation in the pre-cooler inlet duct. The methods include flowing the pre-cooler air stream across the flow-directing surface to generate a boundary layer adjacent the flow-directing surface. The methods further include modifying the boundary layer with the active flow-control device to resist separation of the boundary layer from the flow-directing surface.

DESCRIPTION

Figure 1:
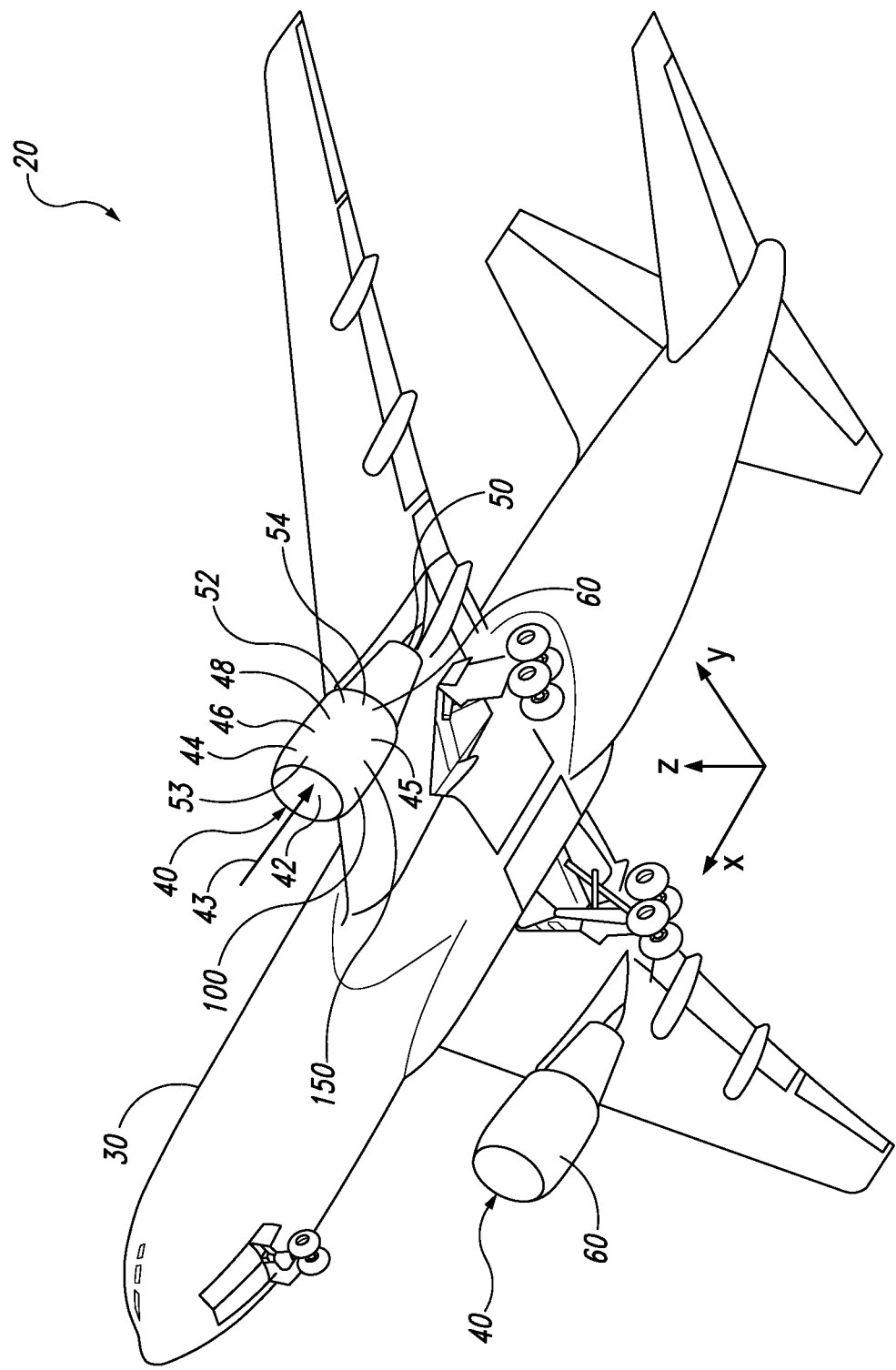
FIG. 1 is a schematic representation of examples of an aircraft that may include a jet engine that may include a pre-cooler inlet duct according to the present disclosure.

FIGS. 1-8 provide illustrative, non-exclusive examples of pre-cooler inlet ducts 100 that include active flow-control devices 150 according to the present disclosure, of nacelles 54 for jet engines 40 that include pre-cooler inlet ducts 100, of aircraft 20 that include jet engines 40, and/or of methods of operating the same. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
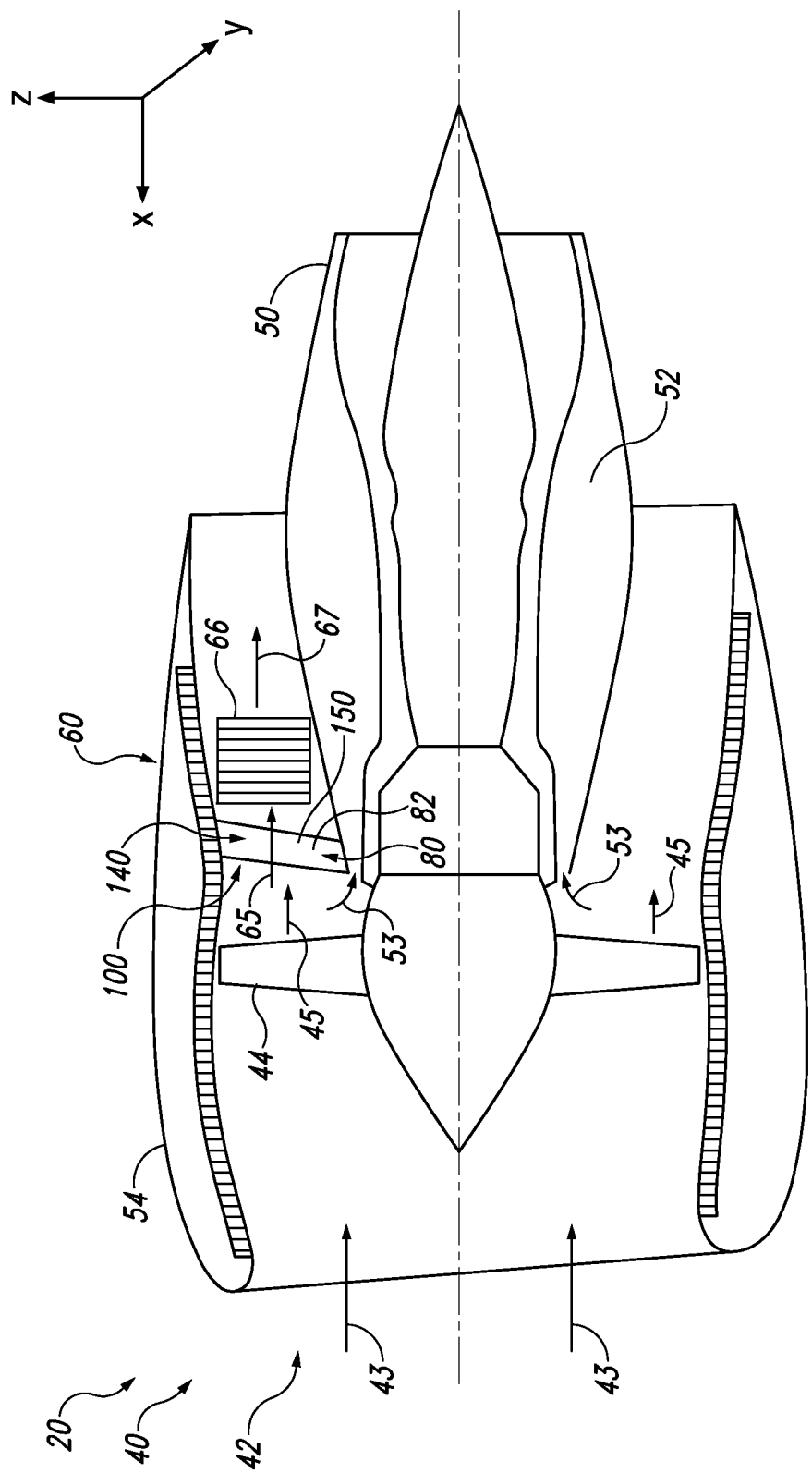
FIG. 2 is a schematic partially fragmentary side view illustrating examples of a jet engine that may include a pre-cooler inlet duct according to the present disclosure.
Figure 3:
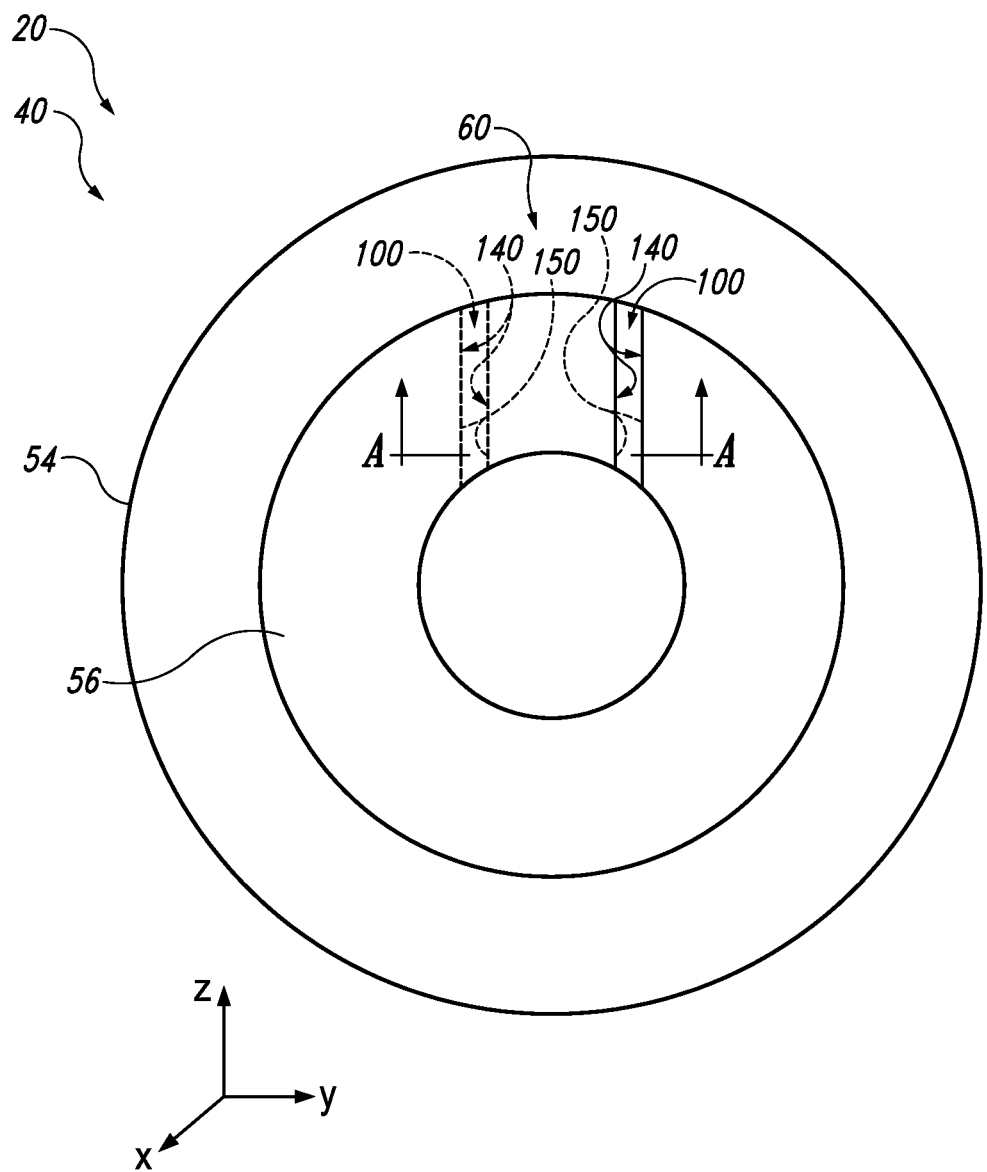
FIG. 3 is a schematic front view illustrating examples of a jet engine that may include a pre-cooler inlet duct according to the present disclosure.

FIG. 1 is a schematic representation of an illustrative, non-exclusive example of an aircraft 20 that may include a jet engine 40 that includes a pre-cooling assembly 60 with a pre-cooler inlet duct 100 according to the present disclosure, while FIGS. 2-3 are more detailed but still illustrative, non-exclusive examples of a jet engine 40 that includes a pre-cooling assembly 60 with a pre-cooler inlet duct 100 according to the present disclosure. More specifically, FIG. 2 is a schematic partially fragmentary side view of jet engines 40, while FIG. 3 is a schematic front view of jet engines 40.

As illustrated in FIG. 1, aircraft 20 includes an airframe 30, which is operatively attached to and/or configured to support one or more jet engines 40. As further illustrated in FIG. 1, jet engines 40 may include a nacelle 54 that may be sized and/or shaped to define, contain, and/or house a variety of components of jet engine 40. As examples, jet engines 40 may include an inlet 42, which is configured to receive an air stream 43, and a compressor 44, which is configured to compress (or increase a pressure of) air stream 43 to generate a compressed air stream 45. Jet engines 40 also may include a burner 46, which is configured to combust a fuel stream with a portion 53 of compressed air stream 45 to generate a combustion stream, and a turbine 48, which is configured to be powered by the combustion stream and to power compressor 44.

As illustrated in FIGS. 1-2, jet engines 40 further may include a nozzle 50, which is configured to permit the combustion stream to be expelled from (or to exit) jet engine 40. As illustrated most clearly in FIG. 2, jet engines 40 may define a central duct 52, which is configured to receive portion 53 of compressed air stream 45 from compressor 44, and pre-cooler inlet duct 100, which is configured to receive another portion of compressed air stream 45, which is referred to herein as a pre-cooler air stream 65. Pre-cooler inlet duct 100 may form a portion of pre-cooling assembly 60 and may provide and/or direct pre-cooler air stream 65 to and/or toward a heat exchanger 66. Heat exchanger 66 may be configured to exchange thermal energy with pre-cooler air stream 65 to generate a heat-exchanged air stream 67. Heat-exchanged air stream 67 may be provided to another component of jet engine 40 and/or of aircraft 20.

As discussed in more detail herein, and when pre-cooler air stream 65 is flowing through pre-cooler inlet duct 100, an active flow-control device 150 may be configured, utilized, and/or operated to resist separation of a boundary layer 80, which includes a boundary layer fluid flow 82, from a flow-directing surface 140 of pre-cooler inlet duct 100. As an illustrative, non-exclusive example, active flow-control device 150 may be configured to modify boundary layer fluid flow 82, thereby changing one or more characteristics of boundary layer fluid flow 82 and permitting boundary layer fluid flow 82 to flow across flow-directing surface 140 without separation therefrom.

In general, pre-cooling assemblies 60 and/or pre-cooler inlet ducts 100 according to the present disclosure that include active flow-control device 150 may be configured to maintain and/or retain boundary layer 80 attached to flow-directing surface 140 over a wide range of average pre-cooler air stream speeds of pre-cooler air stream 65. As illustrative, non-exclusive examples, pre-cooling assemblies 60 and/or pre-cooler inlet ducts 100 according to the present disclosure may maintain boundary layer 80 attached to pre-cooler inlet duct 100 when the average pre-cooler air stream speed is at least 50 meters/second (m/s), at least 75 m/s, at least 100 m/s, at least 125 m/s, at least 150 m/s, at least 175 m/s, at least 200 m/s, at least 225 m/s, at least 250 m/s, at least 275 m/s, and/or at least 300 m/s. Additionally or alternatively, pre-cooling assemblies 60 also may maintain boundary layer 80 attached to flow-directing surface 140 when the average pre-cooler air stream speed is less than 350 m/s, less than 325 m/s, less than 300 m/s, less than 275 m/s, less than 250 m/s, less than 225 m/s, and/or less than 200 m/s.

Active flow-control device 150 may include and/or utilize any suitable active flow-control technology. As an illustrative, non-exclusive example, and as discussed in more detail herein, active flow-control device 150 may be configured to inject a flow-control fluid stream into boundary layer 80. As another illustrative, non-exclusive example, active flow-control device 150 may include a vortex generator that is configured to generate a vortex within boundary layer 80. As yet another illustrative, non-exclusive example, active flow-control device 150 may be configured to remove a suction stream from boundary layer 80.

It is within the scope of the present disclosure that active flow-control device 150 may supply the flow-control fluid stream, may generate the vortex, and/or may remove the suction stream in any suitable manner and/or utilizing any suitable equipment. As illustrative, non-exclusive examples, active flow-control device 150 may include one or more of a piezoelectric actuator, a shape memory alloy actuator, a diaphragm, a pump, a compressor, and/or a fan.

As illustrated in FIG. 3, pre-cooling assembly 60 and pre-cooler inlet duct 100 thereof may be located within an internal volume 56 of nacelle 54. Thus, a size, shape, and/or volume of pre-cooling assembly 60 and/or of pre-cooler inlet duct 100 may be constrained by a target, desired, and/or specified size of nacelle 54 and/or by a size and/or geometry of the other components that may be present within internal volume 56.

As discussed, it may be desirable to increase a flow rate of pre-cooler air stream 65 (as illustrated in FIG. 2) into pre-cooler inlet duct 100 without increasing the size of nacelle 54, and pre-cooling assemblies 60 with bifurcated pre-cooler inlets have been utilized to provide for this increase in flow rate of pre-cooler air stream 65. Such a bifurcated pre-cooler inlet includes two pre-cooler inlet ducts 100. One of these pre-cooler inlet ducts 100 is illustrated in solid lines in FIG. 3, while the other pre-cooler inlet duct 100 is illustrated in dashed lines to indicate that the second pre-cooler inlet duct may be optional. While bifurcated pre-cooler inlets may provide for a measurable increase in the flow rate of pre-cooler air stream 65, it may be desirable to further increase the flow rate of pre-cooler air stream 65 and/or to utilize pre-cooling assemblies that include only a single pre-cooler inlet duct. This may be accomplished by locating one or more active flow-control devices 150 on one or more flow-directing surfaces 140 of pre-cooling assembly 60, and is discussed in more detail herein.

Figure 4:
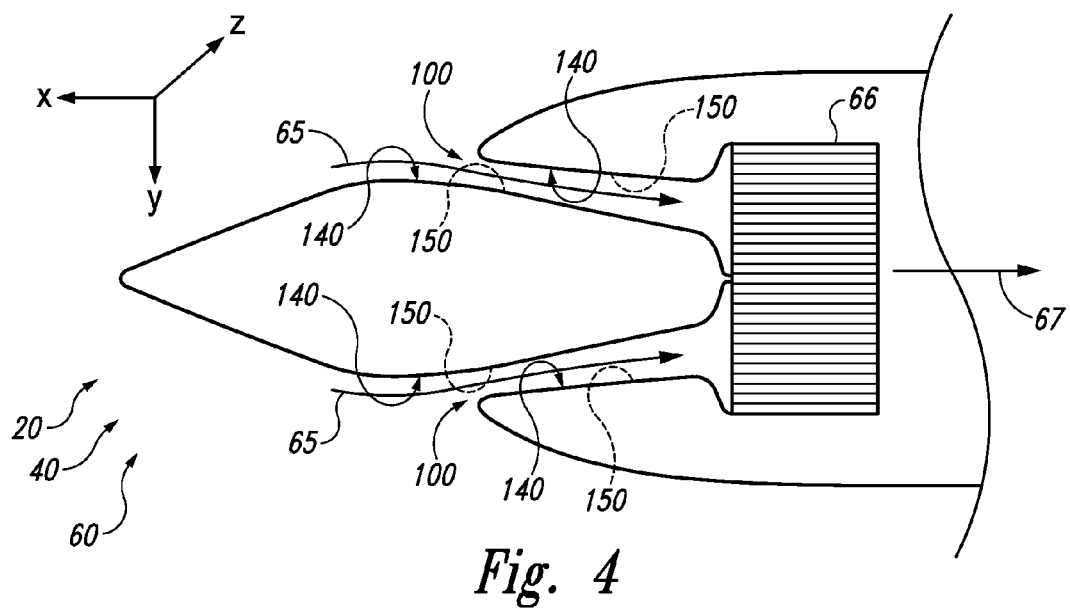
FIG. 4 is a schematic cross-sectional view illustrating examples of a pre-cooler inlet duct according to the present disclosure.
Figure 5:
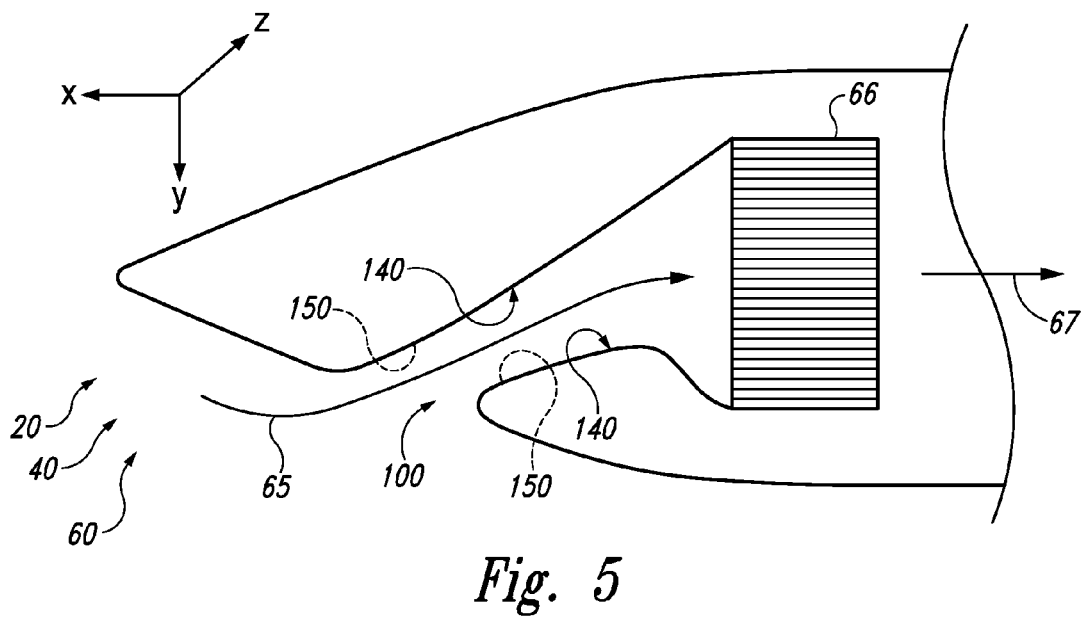
FIG. 5 is a schematic cross-sectional view illustrating examples of a pre-cooler inlet duct according to the present disclosure.

FIGS. 4-5 provide schematic cross-sectional views of illustrative, non-exclusive examples of pre-cooler inlet ducts 100 that may be utilized in pre-cooling assemblies 60 according to the present disclosure. The schematic cross-sectional views of FIGS. 4-5 may be taken along line A-A of FIG. 3.

In FIGS. 4-5, pre-cooling assemblies 60 include one or more pre-cooler inlet ducts 100. Pre-cooler inlet duct 100 may be at least partially defined by one or more flow-directing surfaces 140 and may be configured to direct a pre-cooler air stream 65 toward and/or into contact with a heat exchanger 66. Heat exchanger 66 receives pre-cooler air stream 65 and produces heat-exchanged air stream 67 therefrom. In FIG. 4, pre-cooling assembly 60 includes a bifurcated pre-cooler inlet that includes two pre-cooler inlet ducts 100. In contrast, pre-cooling assembly 60 of FIG. 5 includes a single pre-cooler inlet duct 100.

Figure 6:
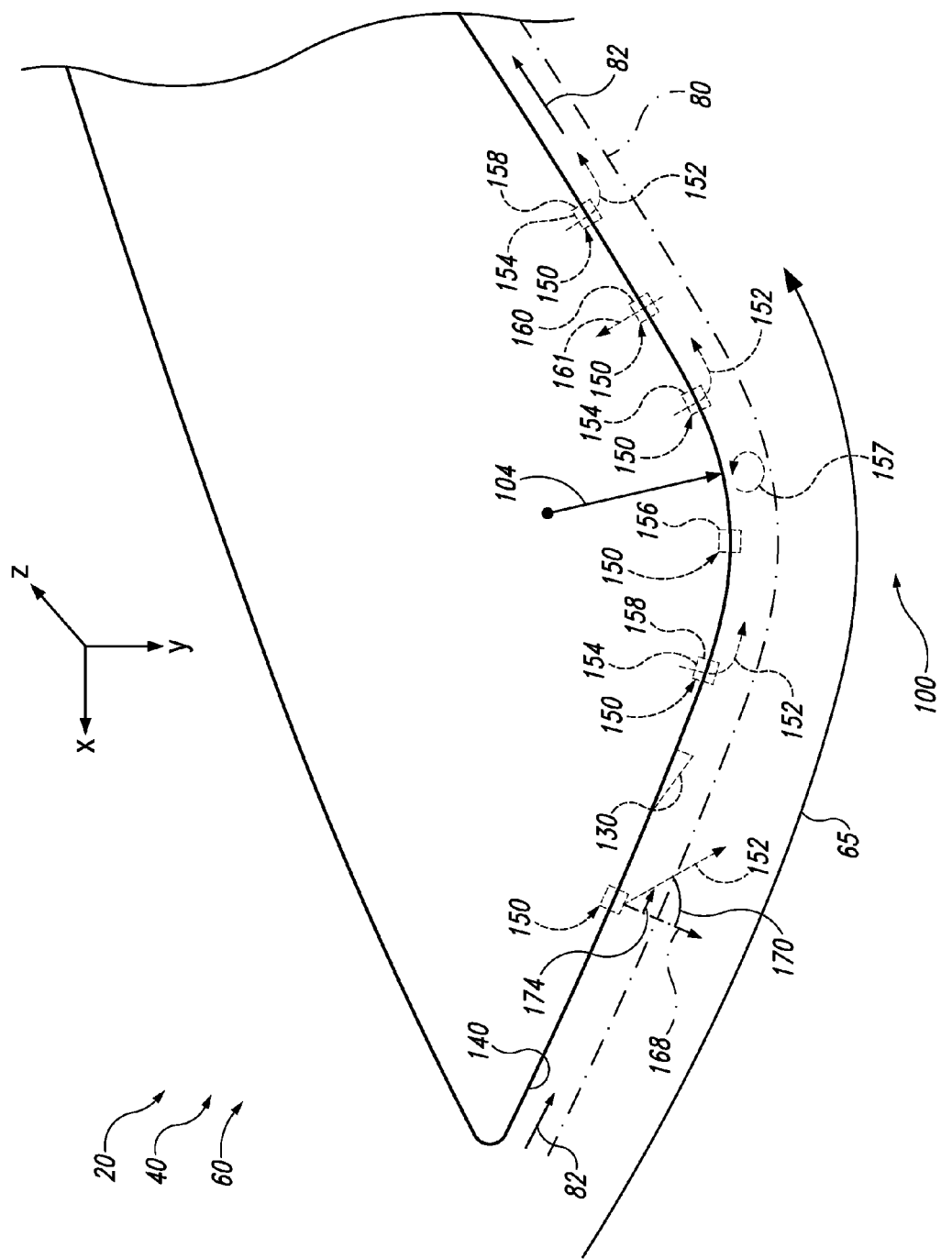
FIG. 6 is a schematic cross-sectional view comparing a conventional flow-directing surface to a flow-directing surface according to the present disclosure.

In FIGS. 4-5, one or more flow-directing surface 140 may include and/or utilize one or more active flow-control devices 150. Active flow-control devices 150 may be configured to resist separation of a boundary layer fluid flow 82 of a boundary layer 80 from respective flow-directing surfaces 140, as illustrated in FIG. 6 and discussed in more detail herein. As also discussed in more detail herein, the presence of active flow-control devices 150 may permit a decrease in one or more dimensions of pre-cooler inlet ducts 100 and/or of pre-cooling assembly 60 and/or may permit pre-cooling assemblies 60 to utilize a single pre-cooler inlet duct 100 (as illustrated in FIG. 5) as opposed to a bifurcated pre-cooler inlet that includes two pre-cooler inlet ducts 100 (as illustrated in FIG. 4) while maintaining a target, or desired, flow rate for pre-cooler air stream 65 and/or for heat-exchanged air stream 67. In this manner, a size of a pre-cooler inlet duct 10 and/or pre-cooling assembly 60 may be reduced without reduction in performance of the pre-cooling assembly 60.

Active flow-control devices 150 are illustrated in dashed lines in FIGS. 4-5 to indicate that active flow-control devices 150 may be located and/or present on any suitable flow-directing surface 140 of pre-cooler inlet ducts 100 according to the present disclosure. As an example, active flow-control devices 150 may be located on multiple (i.e., two or more) flow-directing surfaces 140 that define a given pre-cooler inlet duct 100 (e.g. opposing surfaces 140 of upper and/or lower pre-cooler inlet duct 100 in FIG. 4 or opposing surfaces 140 of the single pre-cooler inlet duct 100 in FIG. 5). As another example, active flow-control devices 150 may be located on one flow-directing surface 140 that defines the given pre-cooler inlet duct 100 but not on another flow-directing surface 140 that defines the given pre-cooler inlet duct 100. As yet another example, flow-control devices 150 may be located on portion(s) of flow-directing surfaces 140 where a large change in direction of boundary layer fluid flow 82 (illustrated in FIG. 6) is present. This may include portion(s) of flow-directing surfaces 140 that have and/or define a (relatively) smaller radius of curvature 104, as discussed herein with reference to FIGS. 6-7.

FIG. 6 is a schematic cross-sectional view of a portion of a pre-cooling assembly 60 including a pre-cooler inlet duct 100 that is at least partially defined by a flow-directing surface 140 according to the present disclosure. As illustrated in FIG. 6, flow-directing surface 140 includes one or more active flow-control devices 150 according to the present disclosure. As discussed, active flow-control devices 150 may be configured to interact with, modify, and/or energize a boundary layer fluid flow 82 that is present within a boundary layer 80 of a pre-cooler air stream 65 that is flowing past flow-directing surface 140 to resist separation of boundary layer 80 from flow-directing surface 140. This may be accomplished in any suitable manner.

As an illustrative, non-exclusive example, active flow-control device 150 may be configured to inject one or more flow-control fluid streams 152 into boundary layer 80 through an injection orifice 154 that may be defined by, within, and/or on flow-directing surface 140. Flow-control fluid stream 152 may be injected into boundary layer 80 in any suitable manner. As an illustrative, non-exclusive example, flow-control fluid stream 152 may be injected at a flow speed, or average flow speed, of at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s. As another illustrative, non-exclusive example, flow-control fluid stream 152 may be injected at a flow speed, or average flow speed, of less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, and/or less than 200 m/s. As yet another illustrative, non-exclusive example, flow-control fluid stream 152 may be injected through injection orifice 154 such that a pressure differential across the injection orifice is at least 1 kilopascal (kPa), at least 5 kPa, at least 10 kPa, at least 15 kPa, at least 20 kPa, at least 25 kPa, at least 30 kPa, at least 35 kPa, at least 40 kPa, at least 50 kPa, at least 75 kPa, at least 100 kPa, at least 150 kPa, at least 200 kPa, at least 300 kPa, at least 400 kPa, at least 500 kPa, at least 600 kPa, and/or at least 700 kPa.

It is within the scope of the present disclosure that active flow-control device 150 may be configured to continuously, or at least substantially continuously, inject flow-control fluid stream 152 into boundary layer 80 when pre-cooler air stream 65 is flowing past flow-directing surface 140. Additionally or alternatively, it is also within the scope of the present disclosure that active flow-control device 150 may be configured to intermittently, selectively, and/or periodically inject flow-control fluid stream 152 into boundary layer 80 when pre-cooler air stream 65 is flowing past flow-directing surface 140.

Flow-control fluid stream 152 may be injected into boundary layer 80 at any suitable location. As an illustrative, non-exclusive example, active flow-control device 150 may be configured to inject a plurality of flow-control fluid streams 152 into boundary layer 80. This may include injecting the plurality of flow-control fluid streams in a spaced-apart manner around a curvature, or radius of curvature, 104 of flow-directing surface 140, as illustrated in FIG. 6. Additionally or alternatively, this also may include injecting the plurality of flow-control fluid streams in a spaced-apart manner along a length of flow-directing surface 140 (i.e., in a spaced-apart manner along the Z-axis of FIG. 6).

As yet another illustrative, non-exclusive example, flow-control fluid stream 152 may be injected behind, downstream of, and/or on a lee side of a step 130 on a surface of flow-directing surface 140. Step 130 may include and/or be any suitable discontinuity and/or change in profile of flow-directing surface 140 and also may be referred to herein as a discontinuity 130.

Flow-control fluid stream 152 may be generated in any suitable manner. As an illustrative, non-exclusive example, flow-control fluid stream 152 may include and/or be a portion of compressed air stream 45 that is generated by jet engine 40 and/or by compressor 44 thereof (as illustrated in FIGS. 1-2). Additionally or alternatively, flow-control fluid stream 152 may include and/or be a synthetic jet that is generated by a synthetic jet generator 158.

As another illustrative, non-exclusive example, active flow-control device 150 may include a suction assembly 160 that is configured to withdraw a suction stream 161 from boundary layer 80. As yet another illustrative, non-exclusive example, active flow-control device 150 may include a vortex generator 156 that is configured to generate a vortex 157 within boundary layer 80. Vortex generator 156 may include any suitable active and/or passive vortex generator 156 that is configured to generate vortex 157 in any suitable manner. As illustrative, non-exclusive examples, vortex generator 156 may include a physical obstruction and/or a vortex generator jet actuator.

When active flow-control device 150 injects flow-control fluid stream 152 into boundary layer 80, flow-control fluid stream 152 may be injected with any suitable orientation and/or at any suitable angle, or injection angle. As an illustrative, non-exclusive example, flow-control fluid stream 152 may be injected into boundary layer 80 at a first injection angle 170. First injection angle 170 may be measured in a first plane that is parallel to a surface normal direction 168 of flow-directing surface 140, and it is within the scope of the present disclosure that first injection angle 170 may include and/or be any suitable angle. The first plane also may be perpendicular to a length of flow-directing surface 140 (i.e., the Z-direction in FIG. 6).

In addition, flow-control fluid stream 152 also may be injected into boundary layer 80 at a second injection angle 174. Second injection angle 174 may be measured in a second plane that is parallel to surface normal direction 168 and perpendicular to the first plane, and it is within the scope of the present disclosure that second injection angle 174 may include any suitable angle. The second plane also may be parallel to the length of flow-directing surface 140.

Illustrative, non-exclusive examples of first injection angle 170 and/or second injection angle 174 include angles of at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, and/or at least 170 degrees. As additional illustrative, non-exclusive examples, first injection angle 170 and/or second injection angle 174 may include angles of less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, and/or less than 5 degrees.

It is within the scope of the present disclosure that first injection angle 170 and/or second injection angle 174 may be a variable angle that varies between any of the above-listed lower limits and any of the above-listed upper limits. Under these conditions, flow-control fluid stream 152 may be generated by a sweeping jet that systematically and/or periodically varies the first injection angle and/or the second injection angle.

The plurality of active flow-control devices may include any suitable number of active flow-control devices. As illustrative, non-exclusive examples, flow-directing surface 140 may include at least 4, at least 8, at least 9, at least 12, at least 18, at least 24, at least 36, at least 72, at least 90, at least 120, at least 180, at least 270, and/or at least 360 active flow-control devices 150 and/or injection orifices 154, or may be configured to inject a corresponding number of flow-control fluid streams 152. As additional illustrative, non-exclusive examples, flow-directing surface 140 also may include fewer than 36, fewer than 72, fewer than 90, fewer than 120, fewer than 180, fewer than 270, fewer than 360, and/or fewer than 720 active flow-control devices 150 and/or injection orifices 154, or may be configured to inject a corresponding number of flow-control fluid streams 152.

When flow-directing surface 140 includes the plurality of active flow-control devices 150 and/or is configured to inject the plurality of flow-control fluid streams 152, the plurality of flow-control fluid streams 152 may be injected in any suitable manner. As an illustrative, non-exclusive example, each of the plurality of flow-control fluid streams may be injected continuously when pre-cooler air stream 65 is flowing past flow-directing surface 140 and/or thorough pre-cooler inlet duct 100. As another illustrative, non-exclusive example, one or more of the flow-control fluid streams 152 may be injected intermittently. This may include (systematically) varying which of the plurality of flow-control fluid streams 152 is being injected at a given point in time.

When active flow-control device 150 is configured to inject the plurality of flow-control fluid streams 152, the plurality of flow-control fluid streams may be injected through the plurality of injection orifices 154, which may be defined by flow-directing surface 140. It is within the scope of the present disclosure that the plurality of injection orifices 154 may include any suitable cross-sectional shape, including circular, elongate, slotted, square, arcuate, and/or rectangular cross-sectional shapes, and that at least a portion of the plurality of injection orifices 154 may have a different cross-sectional shape and/or size relative to a remainder of the plurality of injection orifices 154. It is also within the scope of the present disclosure that active flow-control device 150 may include a continuous, or at least substantially continuous, slot that may be configured to inject one or more flow-control fluid streams along and/or across flow-directing surface 140.

Figure 7:
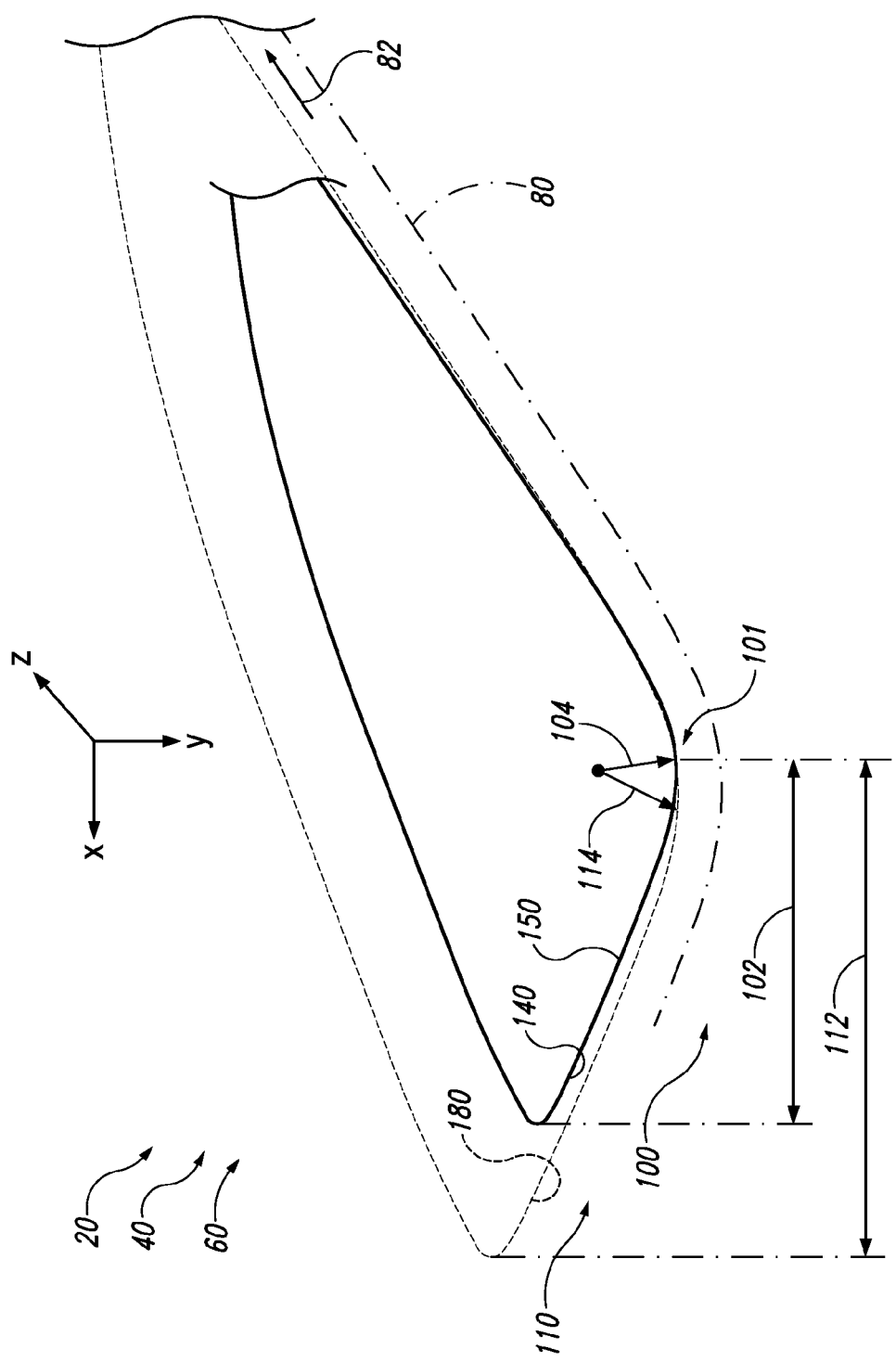
FIG. 7 is a schematic cross-sectional view comparing two flow-directing surfaces according to the present disclosure.

FIG. 7 is a schematic cross-sectional view comparing a conventional pre-cooler inlet duct 110 (illustrated in dashed lines) to a pre-cooler inlet duct 100 according to the present disclosure that includes an active flow-control device 150 (illustrated in solid lines). Pre-cooler inlet ducts 100 according to the present disclosure that include active flow-control devices 150 may provide improved performance over conventional pre-cooler inlet ducts 110 that do not include active flow-control devices 150.

As an illustrative, non-exclusive example, a boundary layer fluid flow 82 within boundary layer 80 that is adjacent a flow-directing surface 140 of pre-cooler inlet duct 100 may define the performance of pre-cooler inlet duct 100. Similarly, a boundary layer fluid flow within a boundary layer that is attached to a conventional flow-directing surface 180 of conventional pre-cooler inlet duct 110 also may define the performance of conventional pre-cooler inlet duct 110. The presence of active flow-control devices 150 in pre-cooler inlet duct 100 according to the present disclosure, may permit pre-cooler inlet duct 100 to have a comparable, or even greater, performance despite having a shorter length 102 than a conventional length 112 of conventional pre-cooler inlet duct 110 and/or despite defining a smaller radius of curvature 104 when compared to a conventional radius of curvature 114 of conventional pre-cooler inlet duct 110. The lengths may be defined relative to a starting point 101 at which a profile of flow-directing surface 140 and/or conventional flow-directing surface 180 changes in order to direct and/or bend boundary layer fluid flow 82. Similarly, the radii of curvature may approximate and/or be a radius of curvature traveled by at least a portion of boundary layer fluid flow 82 as boundary layer fluid flow 82 flows around flow-directing surface 140 and/or conventional flow-directing surface 180, respectively.

As illustrative, non-exclusive examples, length 102 may be less than 90%, less than 80%, less than 70%, less than 60%, less than 50%, less than 40%, less than 30%, and/or less than 20% of conventional length 112. Additionally or alternatively, radius of curvature 104 may be less than 90%, less than 80%, less than 70%, less than 60%, less than 50%, less than 40%, less than 30%, and/or less than 20% of conventional radius of curvature 114.

Decreasing length 102 and/or radius of curvature 104 relative to conventional length 112 and/or conventional radius of curvature 114 may provide performance benefits within jet engines 40 that include pre-cooling assemblies 60 and/or pre-cooler inlet ducts 100 according to the present disclosure. As an illustrative, non-exclusive example, decreasing length 102 and/or radius of curvature 104 may permit jet engines 40 according to the present disclosure to exhibit less weight and/or a smaller overall outer size when compared to comparable conventional jet engines due to the smaller length 102 and/or radius of curvature 104 of pre-cooler inlet duct 100. This may decrease nacelle friction loss with jet engines 40, increasing fuel economy. Additionally or alternatively, this also may provide for increased flexibility regarding location(s) where jet engines 40 may be mounted on aircraft 20.

Figure 8:
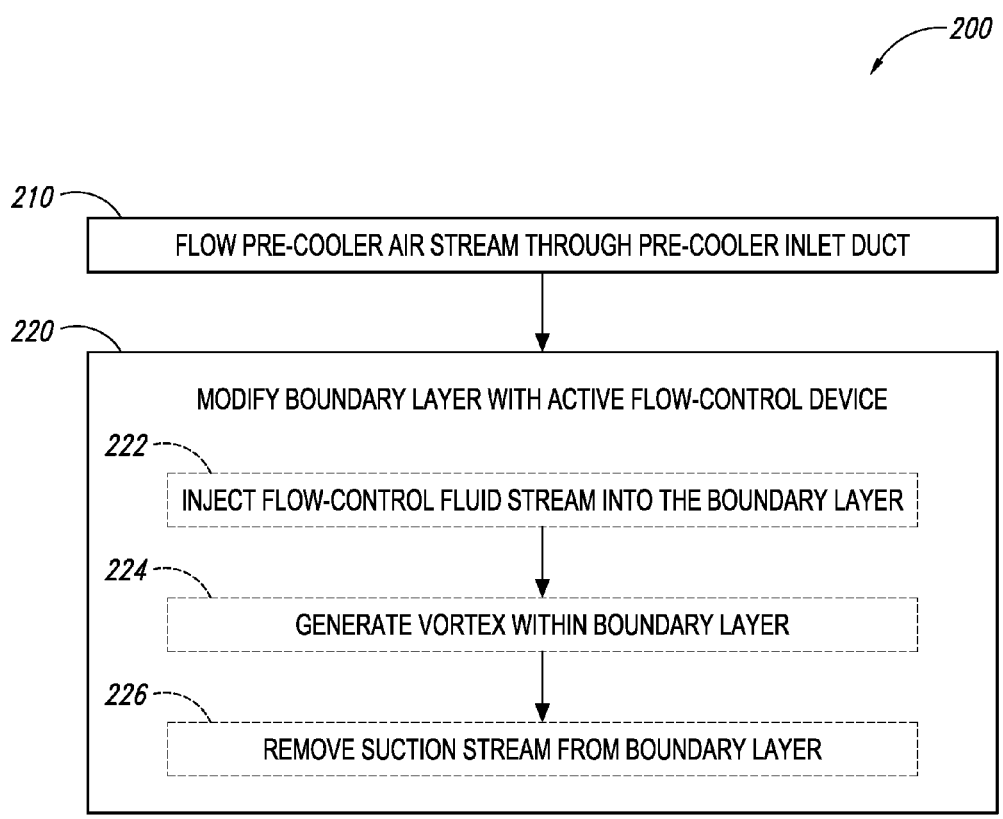
FIG. 8 is a flowchart depicting methods, according to the present disclosure, of resisting boundary layer separation from a pre-cooler inlet duct.

FIG. 8 is a flowchart depicting methods 200, according to the present disclosure, of resisting boundary layer separation from a pre-cooler inlet duct. Methods 200 include flowing a pre-cooler air stream through a pre-cooler inlet duct at 210 and modifying a boundary layer with an active flow-control device at 220.

Flowing the pre-cooler air stream through the pre-cooler inlet duct at 210 may include flowing across a flow-directing surface of the pre-cooler inlet duct and through the pre-cooler inlet duct. The flowing at 210 may include generating the boundary layer, which may include a boundary layer fluid flow, adjacent the flow-directing surface.

The flow-directing surface may define a radius of curvature and/or a length, and the flowing at 210 may include flowing the boundary layer (or the boundary layer fluid flow) along the radius of curvature and/or along the length. As discussed, the boundary layer fluid flow may define a threshold performance, and the radius of curvature may be less than a conventional radius of curvature of a conventional flow-directing surface that produces a comparable threshold performance but that does not utilize the modifying at 220. Additionally or alternatively, the length may be less than a conventional length of the conventional flow-directing surface that produces the comparable threshold performance but that does not utilize the modifying at 220. Examples of relationships between the radius of curvature and the conventional radius of curvature and/or between the length and the conventional length are disclosed herein.

Modifying the boundary layer at 220 may include modifying to resist separation of the boundary layer from the flow-directing surface of the pre-cooler inlet duct. This may include modifying any suitable characteristic, or flow characteristic, of the boundary layer and/or of the boundary layer fluid flow to decrease a potential for separation of the boundary layer from the flow-directing surface, such as under expected and/or nominal operating conditions of a jet engine that includes the pre-cooler inlet duct. As an illustrative, non-exclusive example, the modifying at 220 may include modifying to resist separation of the boundary layer from the flow-directing surface when an average flow speed of the pre-cooler air stream is at least 100 meters/second (m/s), at least 125 m/s, at least 150 m/s, at least 175 m/s, at least 200 m/s, at least 225 m/s, at least 250 m/s, at least 275 m/s, and/or at least 300 m/s. Additionally or alternatively, the modifying also may include modifying to resist separation of the boundary layer from the flow-directing surface when the average speed of the pre-cooler air stream is less than 350 m/s, less than 325 m/s, less than 300 m/s, less than 275 m/s, less than 250 m/s, less than 225 m/s, and/or less than 200 m/s.

The modifying at 220 may be accomplished in any suitable manner. As illustrative, non-exclusive examples, the modifying at 220 may include injecting a flow-control fluid stream into the boundary layer at 222, generating a vortex within the boundary layer at 224, and/or removing a suction stream from the boundary layer at 226.

Injecting the flow-control fluid stream into the boundary layer at 222 may include injecting the flow-control fluid stream through an injection orifice that is defined by, within, and/or along the flow-directing surface. The injecting at 222 may include injecting at any suitable flow speed of the flow-control fluid stream, illustrative, non-exclusive examples of which are disclosed herein. Additionally or alternatively, the injecting at 222 also may include injecting such that any suitable pressure differential, illustrative, non-exclusive examples of which are disclosed herein, is developed across the injection orifice.

The injecting at 222 may include continuously, or at least substantially continuously, injecting the flow-control fluid stream during the flowing at 210. Alternatively, the injecting at 222 also may include intermittently injecting the flow-control fluid stream during the flowing at 210.

It is within the scope of the present disclosure that the injecting at 222 may include injecting at a first injection angle and/or injecting at a second injection angle. Illustrative, non-exclusive examples of the first injection angle and the second injection angle are disclosed herein.

The flow-control fluid stream may be generated in any suitable manner. As an illustrative, non-exclusive example, the injecting at 222 may include directing a compressed air stream through the injection orifice. The compressed air stream may be generated in any suitable manner, such as by the jet engine and/or via any suitable pump and/or compressor. As another illustrative, non-exclusive example, the injecting at 222 may include generating the flow-control fluid stream with a synthetic jet generator.

The injecting at 222 may include injecting a single flow-control fluid stream or a plurality of flow-control fluid streams. When the injecting at 222 includes injecting the plurality of flow-control fluid streams, the injecting at 222 further may include (systematically and/or periodically) varying which of the plurality of flow-control fluid streams is being injected into the boundary layer at a given point in time. Additionally or alternatively, and as discussed, the plurality of flow-control fluid streams may be injected in a spaced-apart manner across the flow-directing surface. Illustrative, non-exclusive examples of a spacing among the plurality of flow-control fluid streams and/or of a number of flow-control fluid streams (and/or corresponding injection orifices) in the plurality of flow-control fluid streams are disclosed herein.

Generating the vortex within the boundary layer at 224 may include generating the vortex in any suitable manner. As an illustrative, non-exclusive example, the generating at 224 may include generating with a vortex generator.

Removing the suction stream from the boundary layer at 226 may include removing the suction fluid stream from the boundary layer in any suitable manner. As an illustrative, non-exclusive example, the removing at 226 may include generating a vacuum within a suction assembly to remove the suction stream from the boundary layer.

Illustrative, non-exclusive examples of inventive subject matter according to the present disclosure are described in the following enumerated paragraphs:

A1. A pre-cooler inlet duct for a jet engine, wherein the pre-cooler inlet duct is configured to receive a pre-cooler air stream from a compressed air stream that is pressurized by a compressor of a jet engine and to direct the pre-cooler air stream into a heat exchanger, the pre-cooler inlet duct comprising:

a flow-directing surface that defines at least a portion of the pre-cooler inlet duct and is shaped to direct the pre-cooler air stream into the heat exchanger; and an active flow-control device located to modify a boundary layer fluid flow within a boundary layer adjacent the flow-directing surface to resist separation of the boundary layer from the flow-directing surface when the pre-cooler air stream flows through the pre-cooler inlet duct.

A2. The pre-cooler inlet duct of paragraph A1, wherein the boundary layer fluid flow defines a threshold performance, and further wherein a radius of curvature of the flow-directing surface is less than a conventional radius of curvature of a conventional flow-directing surface of a conventional pre-cooler inlet duct that produces a comparable threshold performance but that does not include the active flow control device.

A2.1 The pre-cooler inlet duct of paragraph A2, wherein the radius of curvature of the flow-directing surface is less than 90%, less than 80%, less than 70%, less than 60%, less than 50%, or less than 40% of the conventional radius of curvature of the conventional flow-directing surface.

A3. The pre-cooler inlet duct of any of paragraphs A1-A2.1, wherein the boundary layer defines a/the threshold performance, and further wherein a length of the flow-directing surface is less than a conventional length of a/the conventional flow-directing surface that produces a/the comparable threshold performance but that does not include the active flow-control device.

A3.1 The pre-cooler inlet duct of paragraph A3, wherein the length of the flow-directing surface is less than 90% less than 80%, less than 70%, less than 60%, less than 50%, or less than 40% of the conventional length of the conventional flow-directing surface.

A4. The pre-cooler inlet duct of any of paragraphs A1-A3.1, wherein the pre-cooler inlet duct includes the boundary layer.

A4.1 The pre-cooler inlet duct of any of paragraphs A1-A4, wherein the pre-cooler inlet duct includes the boundary layer fluid flow.

A5. The pre-cooler inlet duct of any of paragraphs A1-A4.1, wherein the pre-cooler inlet duct includes the pre-cooler air stream.

A6. The pre-cooler inlet duct of any of paragraphs A1-A5, wherein the active flow-control device is configured to resist separation of the boundary layer from the flow-directing surface when an average pre-cooler air stream flow speed through the pre-cooler inlet duct is at least one of:

(i) at least 100 meters/second (m/s), at least 125 m/s, at least 150 m/s, at least 175 m/s, at least 200 m/s, at least 225 m/s, at least 250 m/s, at least 275 m/s, or at least 300 m/s; and (ii) less than 350 m/s, less than 325 m/s, less than 300 m/s, less than 275 m/s, less than 250 m/s, less than 225 m/s, or less than 200 m/s.

A7. The pre-cooler inlet duct of any of paragraphs A1-A6, wherein the active flow-control device is configured to inject a flow-control fluid stream into the boundary layer through an injection orifice that is defined by the flow-directing surface.

A7.1 The pre-cooler inlet duct of paragraph A7, wherein the injection orifice forms a portion of a sweeping jet.

A7.2 The pre-cooler inlet duct of any of paragraphs A7-A7.1, wherein the pre-cooler inlet duct includes the flow-control fluid stream.

A7.3 The pre-cooler inlet duct of any of paragraphs A7-A7.2, wherein a flow speed of the flow-control fluid stream through the injection orifice is at least one of:

(i) at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s; and (ii) less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, or less than 200 m/s.

A7.4 The pre-cooler inlet duct of any of paragraphs A7-A7.3, wherein a pressure differential of the flow-control fluid stream across the injection orifice is at least 1 kilopascal (kPa), at least 5 kPa, at least 10 kPa, at least 15 kPa, at least 20 kPa, at least 25 kPa, at least 30 kPa, at least 35 kPa, or at least 40 kPa.

A7.5 The pre-cooler inlet duct of any of paragraphs A7-A7.4, wherein the active flow-control device is configured to continuously inject the flow-control fluid stream into the boundary layer when the pre-cooler air stream is flowing through the pre-cooler inlet duct.

A7.6 The pre-cooler inlet duct of any of paragraphs A7-A7.4, wherein the active flow-control device is configured to intermittently inject the flow-control fluid stream into the boundary layer when the pre-cooler air stream is flowing through the pre-cooler inlet duct.

A7.7 The pre-cooler inlet duct of any of paragraphs A7-A7.6, wherein the injection orifice includes at least one of a circular injection orifice, an elongate injection orifice, a slot, and a rectangular slot.

A7.8 The pre-cooler inlet duct of any of paragraphs A7-A7.7, wherein the active flow-control device is configured to inject the flow-control fluid stream into the boundary layer at a first injection angle as measured in a first plane that is parallel to a surface normal of the flow-directing surface and a second injection angle as measured in a second plane that is parallel to the surface normal direction and perpendicular to the first plane.

A7.8.1 The pre-cooler inlet duct of paragraph A7.8, wherein the first injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable first injection angle that varies between any one of (i) and any one of (ii).

A7.8.2 The pre-cooler inlet duct of any of paragraphs A7.8-A7.8.1, wherein the second injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable second injection angle that varies between any one of (i) and any one of (ii).

A7.9 The pre-cooler inlet duct of any of paragraphs A7-A7.8.2, wherein the active flow-control device is configured to inject a plurality of flow-control fluid streams into the boundary layer.

A7.9.1 The pre-cooler inlet duct of paragraph A7.9, wherein the active flow-control device is configured to (systematically) vary which of the plurality of flow-control fluid streams is being injected into the boundary layer at a given point in time.

A7.9.2 The pre-cooler inlet duct of any of paragraphs A7.9-A7.9.1, wherein the active flow-control device is configured to inject the plurality of flow-control fluid streams into the boundary layer via a plurality of injection orifices that is defined by the flow-directing surface.

A7.9.2.1 The pre-cooler inlet duct of paragraph A7.9.2, wherein the plurality of injection orifices is spaced-apart on the flow-directing surface.

A7.9.2.2 The pre-cooler inlet duct of any of paragraphs A7.9.2-A7.9.2.1, wherein the plurality of injection orifices includes at least one of:

(i) at least 4, at least 8, at least 9, at least 12, at least 18, at least 24, at least 36, at least 72, at least 90, at least 120, at least 180, at least 270, or at least 360 injection orifices; and (ii) fewer than 36, fewer than 72, fewer than 90, fewer than 120, fewer than 180, fewer than 270, fewer than 360, or fewer than 720 injection orifices.

A7.10 The pre-cooler inlet duct of any of paragraphs A7-A7.9.2.2, wherein the flow-control fluid stream comprises a compressed air stream that optionally is generated by the jet engine.

A7.11 The pre-cooler inlet duct of any of paragraphs A7-A7.10, wherein the flow-control fluid stream comprises a synthetic jet that optionally is generated by a synthetic jet generator.

A8. The pre-cooler inlet duct of any of paragraphs A1-A7.13, wherein the active flow-control device includes a vortex generator configured to generate a vortex within the boundary layer.

A9. The pre-cooler inlet duct of any of paragraphs A1-A8, wherein the active flow-control device comprises a suction assembly configured to remove a suction stream from the boundary layer.

A10. The pre-cooler inlet duct of any of paragraphs A1-A9, wherein the active flow-control device includes at least one of a piezoelectric actuator, a shape memory alloy actuator, a diaphragm, a pump, a compressor, and a fan.

B1. A nacelle for a jet engine, comprising:
an inlet configured to receive an air stream; and
a pre-cooling assembly including the pre-cooler inlet duct of any of paragraphs A1-A10, wherein the pre-cooler inlet duct is fluidly coupled to an inlet of the nacelle.

B2. The jet engine of paragraph B1, wherein the pre-cooling assembly further includes a heat exchanger that is configured to receive the pre-cooler air stream from the pre-cooler inlet duct.

C1. An aircraft, comprising:
an airframe; and
the jet engine of any of paragraphs B1-B2.

D1. A method of resisting boundary layer separation from a flow-directing surface of a pre-cooler inlet duct, the method comprising:

flowing a pre-cooler air stream across the flow-directing surface and through the pre-cooler inlet duct of a jet engine that includes the pre-cooler inlet duct, wherein the flowing includes generating a boundary layer adjacent the flow-directing surface, and further wherein the boundary layer includes a boundary layer fluid flow; and modifying the boundary layer fluid flow with an active flow-control device to resist separation of the boundary layer from the flow-directing surface.

D2. The method of paragraph D1, wherein the boundary layer fluid flow defines a threshold performance, wherein the flow-directing surface defines a radius of curvature, wherein the flowing includes flowing the boundary layer along the radius of curvature, and further wherein the radius of curvature is less than a conventional radius of curvature of a conventional flow-directing surface that produces a comparable threshold performance but that does not utilize the modifying.

D2.1 The method of paragraph D2, wherein the radius of curvature of the flow-directing surface is less than 90% less than 80%, less than 70%, less than 60%, less than 50%, or less than 40% of the conventional radius of curvature of the conventional flow-directing surface.

D3. The method of any of paragraphs D1-D2.1, wherein the boundary layer fluid flow defines a/the threshold performance, and further wherein a length of the flow-directing surface is less than a conventional length of a/the conventional flow-directing surface that produces a/the comparable threshold performance but that does not utilize the modifying.

D3.1. The method of paragraph D3, wherein the length of the flow-directing surface is less than 90% less than 80%, less than 70%, less than 60%, less than 50%, or less than 40% of the conventional length of the conventional flow-directing surface.

D4. The method of any of paragraphs D1-D3.1, wherein the modifying includes modifying to resist separation of the boundary layer from the flow-directing surface when an average flow speed of the pre-cooler air stream is at least one of:

(i) at least 100 meters/second (m/s), at least 125 m/s, at least 150 m/s, at least 175 m/s, at least 200 m/s, at least 225 m/s, at least 250 m/s, at least 275 m/s, or at least 300 m/s; and (ii) less than 350 m/s, less than 325 m/s, less than 300 m/s, less than 275 m/s, less than 250 m/s, less than 225 m/s, or less than 200 m/s.

D5. The method of any of paragraphs D1-D4, wherein the modifying includes injecting a flow-control fluid stream into the boundary layer through an injection orifice that is defined by the flow-directing surface.

D5.1 The method of paragraph D5, wherein a flow speed of the flow-control fluid stream through the injection orifice is at least one of:

(i) at least 100 meters/second (m/s), at least 125 m/s, at least 150 m/s, at least 175 m/s, at least 200 m/s, at least 225 m/s, at least 250 m/s, at least 275 m/s, at least 300 m/s, at least 350 m/s, at least 400 m/s, at least 450 m/s, or at least 500 m/s; and (ii) less than 700 m/s, less than 650 m/s, less than 600 m/s, less than 550 m/s, less than 500 m/s, less than 450 m/s, less than 400 m/s, less than 350 m/s, less than 325 m/s, less than 300 m/s, less than 275 m/s, less than 250 m/s, less than 225 m/s, or less than 200 m/s.

D5.2 The method of any of paragraphs D5-D5.1 wherein a pressure differential of the flow-control fluid stream across the injection orifice is at least 1 kilopascal (kPa), at least 5 kPa, at least 10 kPa, at least 15 kPa, at least 20 kPa, at least 25 kPa, at least 30 kPa, at least 35 kPa, or at least 40 kPa.

D5.3 The method of any of paragraphs D5-D5.2, wherein the injecting includes continuously injecting the flow-control fluid stream while the pre-cooler air stream is flowing through the pre-cooler inlet duct.

D5.4 The method of any of paragraphs D5-D5.2, wherein the injecting includes intermittently injecting the flow-control fluid stream while the pre-cooler air stream is flowing through the pre-cooler inlet duct.

D5.5 The method of any of paragraphs D5-D5.4, wherein the injecting includes injecting at a first injection angle as measured in a first plane that is parallel to a surface normal of the flow-directing surface and at a second injection angle as measured in a second plane that is parallel to the surface normal direction and perpendicular to the first plane.

D5.5.1 The method of paragraph D5.5, wherein the first injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable first injection angle that varies between any one of (i) and any one of (ii).

D5.5.2 The method of any of paragraphs D5.5-D5.5.1, wherein the second injection angle is at least one of:

(i) at least 0 degrees, at least 5 degrees, at least 10 degrees, at least 15 degrees, at least 20 degrees, at least 30 degrees, at least 40 degrees, at least 50 degrees, at least 60 degrees, at least 70 degrees, at least 80 degrees, at least 90 degrees, at least 100 degrees, at least 110 degrees, at least 120 degrees, at least 130 degrees, at least 140 degrees, at least 150 degrees, at least 160 degrees, or at least 170 degrees;

(ii) less than 180 degrees, less than 170 degrees, less than 160 degrees, less than 150 degrees, less than 140 degrees, less than 130 degrees, less than 120 degrees, less than 110 degrees, less than 100 degrees, less than 90 degrees, less than 80 degrees, less than 70 degrees, less than 60 degrees, less than 50 degrees, less than 40 degrees, less than 30 degrees, less than 20 degrees, less than 15 degrees, less than 10 degrees, or less than 5 degrees; and (iii) a variable second injection angle that varies between any one of (i) and any one of (ii).

D5.6 The method of any of paragraphs D5-D5.5.2, wherein the method further includes directing a compressed air stream (that optionally is generated by the jet engine) through the injection orifice to generate the flow-control fluid stream.

D5.7 The method of any of paragraphs D5-D5.6, wherein the method further includes generating the flow-control fluid stream with a synthetic jet generator.

D5.8 The method of any of paragraphs D5-D5.7, wherein the injecting includes injecting a plurality of flow-control fluid streams into the boundary layer.

D5.8.1 The method of paragraph D5.8, wherein the injecting includes (systematically) varying which of the plurality of flow-control fluid streams is being injected into the boundary layer at a given point in time.

D5.8.2 The method of any of paragraphs D5.8-D5.8.1, wherein the injecting includes injecting the plurality of flow-control fluid streams in a spaced-apart manner across the flow-directing surface.

D5.8.3 The method of any of paragraphs D5.8-D5.8.2, wherein the plurality of flow-control fluid streams includes at least one of:

(i) at least 8, at least 9, at least 12, at least 18, at least 24, at least 36, at least 72, at least 90, at least 120, at least 180, at least 270, or at least 360 injection orifices; and (ii) fewer than 36, fewer than 72, fewer than 90, fewer than 120, fewer than 180, fewer than 270, fewer than 360, or fewer than 720 injection orifices.

D6. The method of any of paragraphs D1-D5.8.3, wherein the modifying includes generating a vortex within the boundary layer with a vortex generator.

D7. The method of any of paragraphs D1-D6, wherein the modifying includes removing a suction stream from the boundary layer with a suction assembly.

D8. The method of any of paragraphs D1-D7, wherein the modifying includes modifying with at least one of a piezoelectric actuator, a shape memory alloy actuator, a diaphragm, a pump, a compressor, and a fan.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A jet engine, comprising:
   a nacelle including an inlet configured to receive an air stream;
   a compressor positioned within the nacelle and configured to receive the air stream and to pressurize the air stream to generate a compressed air stream;
   a pre-cooler inlet duct positioned within the nacelle and configured to receive a portion of the compressed air stream as a pre-cooler air stream; and
   a heat exchanger positioned within the nacelle and configured to receive the pre-cooler air stream, wherein the pre-cooler inlet duct is configured to direct the pre-cooler air stream into the heat exchanger; and
   further wherein the pre-cooler inlet duct includes;
   (i) a flow-directing surface that defines at least a portion of the pre-cooler inlet duct and is shaped to direct the pre-cooler air stream into the heat exchanger; and
   (ii) an active flow-control device located to modify a boundary layer fluid flow within a boundary layer adjacent the flow-directing surface to resist separation of the boundary layer from the flow-directing surface when the pre-cooler air stream flows through the pre-cooler inlet duct, wherein the active flow-control device is configured to inject a flow-control fluid stream into the boundary layer through an injection orifice that is defined by the flow-directing surface, wherein the injection orifice is configured to inject the flow-control fluid stream at an injection angle that periodically varies between a lower angle limit and an upper angle limit, and further wherein the lower angle limit and the upper angle limit are defined in a plane that is parallel to a surface normal direction of the flow-directing surface;
   and wherein the injection angle contains a first directional component that is parallel to a circumferential direction of the jet engine, and a second directional component that is parallel to a longitudinal axis of the jet engine.

2. The jet engine of claim 1, wherein the compressor provides the portion of the compressed air stream that comprises the pre-cooler air stream to the pre-cooler inlet duct at an average flow speed of at least 100 meters/second (m/s) and less than 350 m/s, and further wherein the active flow control device resists separation of the boundary layer from the flow-directing surface.

3. The jet engine of claim 1, wherein the active flow-control device is configured to continuously inject the flow-control fluid stream into the boundary layer when the pre-cooler air stream is flowing through the pre-cooler inlet duct.

4. The jet engine of claim 1, wherein the active flow-control device is configured to intermittently inject the flow-control fluid stream into the boundary layer when the pre-cooler air stream is flowing through the pre-cooler inlet duct.

5. The jet engine of claim 1, wherein the active flow-control device is configured to inject a plurality of flow-control fluid streams into the boundary layer.

6. The jet engine of claim 5, wherein the active flow-control device is configured to vary which of the plurality of flow-control fluid streams is being injected into the boundary layer at a given point in time.

7. The jet engine of claim 1, wherein the active flow-control device includes a vortex generator configured to generate a vortex within the boundary layer.

8. The jet engine of claim 1, wherein the active flow-control device comprises a suction assembly configured to remove a suction stream from the boundary layer.

9. An aircraft, comprising:
   an airframe; and
   the jet engine of claim 1, wherein the jet engine is operatively attached to the airframe.

10. The jet engine of claim 1, wherein the plane that is parallel to the surface normal direction of the flow-directing surface also is parallel to a flow direction of the pre-cooler air stream.

11. A method of resisting boundary layer separation from a flow-directing surface of a pre-cooler inlet duct of a jet engine, the method comprising:
   receiving an air stream with an inlet of a nacelle of the jet engine;
   compressing the air stream with a compressor of the jet engine to pressurize the air stream and generate a compressed air stream;
   flowing a portion of the compressed air stream, as a pre-cooler air stream, across the flow-directing surface of the pre-cooler inlet duct and through the pre-cooler inlet duct, wherein the flowing includes generating a boundary layer adjacent the flow-directing surface, and further wherein the boundary layer includes a boundary layer fluid flow; and
   modifying the boundary layer fluid flow with an active flow-control device to resist separation of the boundary layer from the flow-directing surface of the pre-cooler inlet duct, wherein the modifying includes injecting a flow-control fluid stream into the boundary layer through an injection orifice that is defined by the flow-directing surface, wherein the injection orifice is configured to inject the flow-control fluid stream at an injection angle, wherein the injecting includes periodically varying the injection angle between a lower angle limit and an upper angle limit, and further wherein the lower angle limit and the upper angle limit are defined in a plane that is parallel to a surface normal direction of the flow-directing surface;

and wherein the injection angle contains a first directional component that is parallel to a circumferential direction of the jet engine, and a second directional component that is parallel to a longitudinal axis of the jet engine.

12. The method of claim 11, wherein the injecting includes at least one of:
  (i) continuously injecting the flow-control fluid stream while the pre-cooler air stream is flowing through the pre-cooler inlet duct; and
  (ii) intermittently injecting the flow-control fluid stream while the pre-cooler air stream is flowing through the pre-cooler inlet duct.

13. The method of claim 11, wherein the method further includes directing a compressed air stream through the injection orifice to generate the flow-control fluid stream.

14. The method of claim 11, wherein the injecting includes injecting a plurality of flow-control fluid streams into the boundary layer, and further wherein the injecting includes varying which of the plurality of flow-control fluid streams is being injected into the boundary layer at a given point in time.

15. The method of claim 11, wherein the modifying includes at least one of:
  (i) generating a vortex within the boundary layer with a vortex generator; and
  (ii) removing a suction stream from the boundary layer with a suction assembly.

16. The method of claim 11, wherein:
  (i) the flowing includes flowing the pre-cooler inlet stream at an average flow speed of at least 100 meters/second (m/s) and less than 350 m/s; and
  (ii) the modifying includes resisting separation of the boundary layer from the flow-directing surface.

17. The method of claim 11, wherein the plane that is parallel to the surface normal direction of the flow-directing surface also is parallel to a flow direction of the pre-cooler air stream.

* * * * *